United States Patent
Maksimov et al.

(10) Patent No.: US 8,915,114 B2
(45) Date of Patent: Dec. 23, 2014

(54) DEVICE AND TOOL FOR COLD EXPANSION OF FASTENER HOLES

(75) Inventors: Yordan Todorov Maksimov, Gabrovo (BG); Galia Velikova Duncheva, Gabrovo (BG)

(73) Assignee: Maksimov Consult AD, Gabrovo (BG)

( * ) Notice: Subject to any disclaimer, the term of this patent is extended or adjusted under 35 U.S.C. 154(b) by 323 days.

(21) Appl. No.: 13/295,046

(22) Filed: Nov. 18, 2011

(65) Prior Publication Data
US 2013/0071503 A1 Mar. 21, 2013

(30) Foreign Application Priority Data
Sep. 19, 2011 (BG) .................................... 111035

(51) Int. Cl.
*B21D 41/02* (2006.01)
*B23P 9/02* (2006.01)
(52) U.S. Cl.
CPC ...................................... *B23P 9/025* (2013.01)
USPC ................................ 72/391.2; 2/393; 2/466.8
(58) Field of Classification Search
USPC ........... 72/370.05, 370.07, 391.2, 391.4, 393, 72/453.19, 465.1, 466.8, 479; 29/507, 29/523, 243.518
See application file for complete search history.

(56) References Cited

U.S. PATENT DOCUMENTS

| | | | | | |
|---|---|---|---|---|---|
| 4,077,102 | A | * | 3/1978 | Smith | 29/252 |
| 4,253,324 | A | * | 3/1981 | Nugent | 72/393 |
| 4,557,033 | A | * | 12/1985 | Champoux | 29/525 |
| 4,665,732 | A | * | 5/1987 | Hogenhout | 72/393 |
| 4,869,091 | A | * | 9/1989 | Shemeta | 72/393 |
| 5,127,254 | A | * | 7/1992 | Copple et al. | 72/370.07 |
| 5,433,100 | A | * | 7/1995 | Easterbrook et al. | 72/391.2 |
| 7,024,908 | B2 | * | 4/2006 | Poast et al. | 72/391.2 |
| 7,024,909 | B2 | * | 4/2006 | Cobzaru et al. | 72/393 |
| 8,061,178 | B2 | * | 11/2011 | Glenn | 72/391.2 |
| 8,402,806 | B2 | * | 3/2013 | Glenn et al. | 72/391.2 |
| 8,553,193 | B2 | * | 10/2013 | Chang et al. | 349/145 |

* cited by examiner

*Primary Examiner* — Edward Tolan
(74) *Attorney, Agent, or Firm* — Porter, Wright, Morris & Arthur, LLP (57) ABSTRACT

The invention refers to a tool for cold expansion of fastener holes. The tool comprises a mandrel (1) with a conical working part (2), a cylindrical sleeve (4) with a conical hole (5), wherein the sleeve (4) is entirely split from end to end into separate, laterally touching one another, segments (6), fixed in a cylindrical hole (14) of a threaded bush (7) and along the outer cylindrical surface (8) of the mandrel (1). The bush (7) is attached immovably to a device, fixing the segments (6), and each segment (6) gets into contact with the conical surface (2) of the mandrel (1) along only one generatrix (16), laying in the symmetry plane (17) of the respective segment (6). The advantage of the tool is in the possibility to control the degree of cold expansion.

9 Claims, 7 Drawing Sheets

DEVICE AND TOOL FOR COLD EXPANSION OF FASTENER HOLES

FIELD OF THE INVENTION

The field of the invention relates to a device and a tool for cold expansion of fastener holes by means of plastic deformation and can be applied in working of holes in structural elements subjected subsequently to cyclic external loads, which are made of tough-plastic materials and of anisotropic aluminum/carbon fiber reinforced plastics.

BACKGROUND OF THE INVENTION

From U.S. Pat. No. 4,665,732 a device is known for cold expansion of holes by means of a tool comprising a longitudinally split hollow mandrel. A round pin is introduced into the axial hole of the mandrel. The device comprises a hydraulic cylinder in which a first piston with a piston rod is placed to whose end the longitudinal split hollow mandrel of the tool is fixed. A support in contact with the work piece to be worked during pulling the hollow mandrel through the hole, is fixed immovably. In an axial hole worked in the first piston and its piston rod, a second piston rod is inserted whose end is connected to the round pin which makes the mandrel rigid. A second piston connected to the second piston rod is placed in a second cylinder coaxial to the first one and connected to it. The device has a power hydraulic system driven and controlled by means of compressed air.

When working fastener holes using the known device and tool the degree of cold expansion of the hole depends only on the diameter dimensions of the mandrel and pin as well as on the diameter of the previously drilled hole. To guarantee the degree of cold expansion specified with a certain tolerance, it is necessary to control by geometric criterion by means of gauges both the diameter of the previously drilled hole and the mandrel working part.

Furthermore, working is carried out sequentially, expansion is performed layer by layer along the hole axis, whereupon a deformation wave passes causing at every point of the hole surface alternating stresses whose absolute value exceeds significantly the yield limit of the material. Due to a support placed against the movement of the stiffened mandrel, an axial force flow passes through the work piece being worked and as a result an asymmetric axial gradient of the generated zone of compression residual stresses around the hole is obtained. At the hole entrance residual stresses with minimum absolute value occur. Furthermore, at the entrance and exit, around the hole edge, significant axial deformations appear known as "surface upset"

As a result of all this, when employing the known device and tool for cold extension, along the axis of the hole to be worked, a non-uniform and asymmetric zone of compression residual stresses arises, which is a prerequisite for fatigue cracks growth, initiating from the entrance face with residual stresses with minimum absolute value. The axial deformation along the hole edges are a prerequisite for wear and growth of microcracks in consequence of the detrimental fretting effect. As a result, cyclically or dynamically loaded structural elements will have shorter fatigue life and respectively less reliability. In case of static loads, the resistance of the elements to crack appearance will be lowered.

From BG Patent No 66052 a tool for cold expansion of holes is known, comprising a mandrel with a conical working part. Between the mandrel and the hole to be worked is positioned a longitudinally split into three, four or more portions cylindrical sleeve with a conical hole at one end which has a cone angle α equal to the angle of the working conical part of the mandrel. The longitudinally split cylindrically shaped sleeve comprises an immovably fixed non-split part in its other end which is ⅕ of the total length of the sleeve. As a result of the relative axial displacement between the mandrel and sleeve, its split part enhances its radial dimensions, expanding in this way the hole being worked, on the account of inserting the conical working part of the mandrel into the conical hole of the sleeve.

When expanding fastener holes with the known tool, there is an edge contact between the mandrel conical surface and the conical surfaces of the working parts of the sleeve during their relative motion along their common axis because circular cross sections with a larger radius get into contact with the cross sections of the working parts of the sleeve having a smaller radius. In this way, in the process of working the hole, the mandrel conical surface is in contact with longitudinally oriented edges of the working parts of the split sleeve. As a result, the transfer function between the axial displacement of the mandrel and the radial displacement of the working parts of the split sleeve is non-linear, and therefore practically it is not possible to control a precisely preset degree of cold expansion of the hole to be worked. At the same time, this edge contact leads to useless increase in the axial force applied to the mandrel, required for working the hole. Furthermore, the edge contact parameters vary at each instant of the mandrel motion and hence the driving device is subjected to undesired pulsations. At the initial moment of the cold expansion process when the working parts of the sleeve are positioned in the hole to be worked, between every two working parts there is a clearance equal to the thickness of the tool with which the sleeve was split. In the process of cold expansion this clearance increases. As a result, in the cross section of the hole, the zone of compression residual stresses, though it has a pole of symmetry, it is non-homogeneous. Furthermore, the requirement that the outer cylindrical surface of each working part should have a radius larger than the radius of the previously drilled hole that is to be expanded, causes manufacturing difficulties when making the sleeve, due to the fact that it is not entirely split.

TECHNICAL DESCRIPTION OF THE INVENTION

The object of this invention is to develop a device and a tool for cold expansion of fastener holes, making possible the realization of various degrees of cold expansion with one tool which has an improved manufacturability and herewith for running the process a smaller axial force is required and the compression residual stress zone is practically uniform not only in axial but also in circumferential direction.

The object has been solved by developing a device for cold expansion of fastener holes by means of plastic deformation comprising a hydraulic cylinder in which a piston with a piston rod is placed to whose end a mandrel is fixed for performing the expansion. According to the invention, a threaded bush of the tool is immovably fixed to the body of the hydraulic cylinder of the device. In an axial blind hole in the piston rod, a linear displacement sensor is placed and fixed immovably to the hydraulic cylinder, and in an axial hole in the piston a magnet is fixed immovably designed to activate the linear displacement sensor. The latter is connected to a control block, electrically connected to a pressure sensor and to electromagnets of hydraulic control valve which is hydraulically connected to two 'throttle controllable-non-return valve' blocks, designed respectively for both directions of the working fluid motion.

The object has also been solved by a tool for cold expansion of fastener holes comprising a mandrel with a taper working part. Between the mandrel and the hole to be worked is placed a longitudinally split into three, four or more parts cylindrical sleeve with a conical hole at one end, whose cone angle is equal to the angle of the mandrel working conical part. According to the invention, the cylindrical sleeve is entirely split from end to end into separate, touching sideways one another without a clearance, segments which are fixed without a clearance at the other end in a cylindrical hole of the threaded bush connected to the device and along the outer cylindrical surface of the mandrel. The threaded bush is attached immovably to a driving device fixing the segments in axial direction. Each segment is in contact with the conical surface of the mandrel along only one generatrix lying in the symmetry plane of the respective segment for each reciprocal position of the mandrel and segments.

Preferably, around the outer cylindrical surfaces of the segments, at a distance of up to 10 mm from their working surfaces contacting the hole to be cold expanded, an elastic element is attached for returning the segments to their original position.

Preferably also, the segments to be positioned in the cylindrical hole of the threaded bush with a possible radial displacement such that between the segments and the threaded bush an elastic element to be placed.

The conical hole in the split sleeve and the conical surface in the mandrel working part expand in the direction of the split sleeve end which contacts the hole to be plastically deformed.

In a variant of the embodiment, the homonymic rotational outer surfaces with radii $R_i^e$ of the segments form a respective continuous outer surface which is not smooth due to longitudinal edges formed by the side contacts between the segments such that the radii of the circles circumscribed around the obtained continuous but not smooth outer surfaces are $r_i^e$, whereat:

$$R_i = r_i \left(1 + \frac{k^2}{\sin\frac{\pi}{n}} + \frac{2k}{tg\frac{\pi}{n}}\right)^{\frac{1}{2}},$$

$$\text{where } k = \frac{\delta}{2r_i},$$

$\delta$ is the width of the tool with which the cylindrical sleeve is split longitudinally, and n is the number of segments.

It is possible, in another variant of the embodiment, the homonymic rotational outer surfaces with radii $R_i^e$ of the segments to form a respective continuous outer surface which is smooth.

Respectively, in the first variant of the embodiment, the homonymic rotational inner surfaces with radii $R_i^e$ of the segments, form a respective continuous inner surface which is not smooth due to longitudinal edges formed by the side contacts between the segments and the radii of the inscribed circles in the obtained continuous but not smooth inner surfaces are $r_i^i$, whereat:

$$R_i^i = r_i + \frac{\delta}{2\sin\frac{\pi}{n}},$$

where $\delta$ is the width of the tool with which the cylindrical sleeve is split longitudinally, and n is the number of segments.

In the second variant of the embodiment, the homonymic rotational inner surfaces with radii $R_i^i$ of the segments form a respective continuous inner surface which is smooth.

The cylindrical surfaces of the segments having a contact with the hole to be cold expanded, have radii R, determined by the formula:

$$R = \frac{d_0}{2}\left(1 + \frac{DCE}{100}\right),$$

where $d_0$ is the diameter of the hole previously drilled, DCE is the degree of cold extension in percentage.

The advantages of the device are in the possibility to control the degree of cold extension when the device is supplied with a tool having specified dimensions according to the invention. The process of cold extension carried out with the device is not dimensional, since with one and the same tool different degrees of cold extension are realized depending on the axial stroke of the mandrel after reaching the set minimum pressure on the piston, respectively, after reaching a tight contact between the conical part of the mandrel, segments and hole. In this way a relatively wider tolerance of the diameter of the previously drilled hole is allowed and it is not necessary a check with a gauge as it is typical of dimensional processes.

Another advantage is that an axial force flow does not pass through the work piece being worked because the flow closes itself passing through the device and tool and a possibility is provided for creating a practically uniformly distributed in axial direction zone of compressive residual stresses having a minimal and symmetrical gradient around the worked fastener holes in structural elements. As a result, the cyclically loaded structural elements will have longer fatigue lifetimes.

Owing to the purely radial effect of segments on the hole surface and lack of friction during sliding in axial direction, the axial deformations along its two edges—surface upset will be minimum which will minimize the possibility the detrimental fretting effect to appear.

BRIEF DESCRIPTION OF THE DRAWINGS

These and further features of the present invention will be apparent with reference to the following description and drawings, wherein.

DETAILED DESCRIPTION OF CERTAIN PREFERRED EMBODIMENTS

According to a preferred embodiment of the invention the device 61 for cold expansion of fastener holes comprises (FIG. 1) a hydraulic cylinder 27, in which a piston 26 is placed with a seal 31, connected to a piston rod 25, in whose hole 24 by means of thread 23 a mandrel 1 of the tool 60 is fixed. To the hydraulic cylinder 27 a flange 9 is fixed to which a threaded bush 7 of the tool 60 is fixed immovably. In an axial blind hole 55 of the piston rod 25 a linear displacement sensor 34 is positioned which by means of threaded joint 56 is fixed immovably to hydraulic cylinder 27. A control block 38 (FIG. 9) is comprised, corresponding with the linear displacement sensor 34, with the pressure sensor 37 and with electromagnets 41 and 42 of hydraulic control valve 43, which is fed with working fluid by means of a hydraulic pump 46. The hydraulic control valve 43 corresponds in sequence with two 'throttle controllable-non-return valve' blocks 39 and 40, depending on the direction of working fluid motion. A safety valve 45 and a pressure gauge 44 are included to control the pressure of the working fluid. The working fluid is stored in a tank 48 and it is filtered by means of a filter 47.

Figure 1:
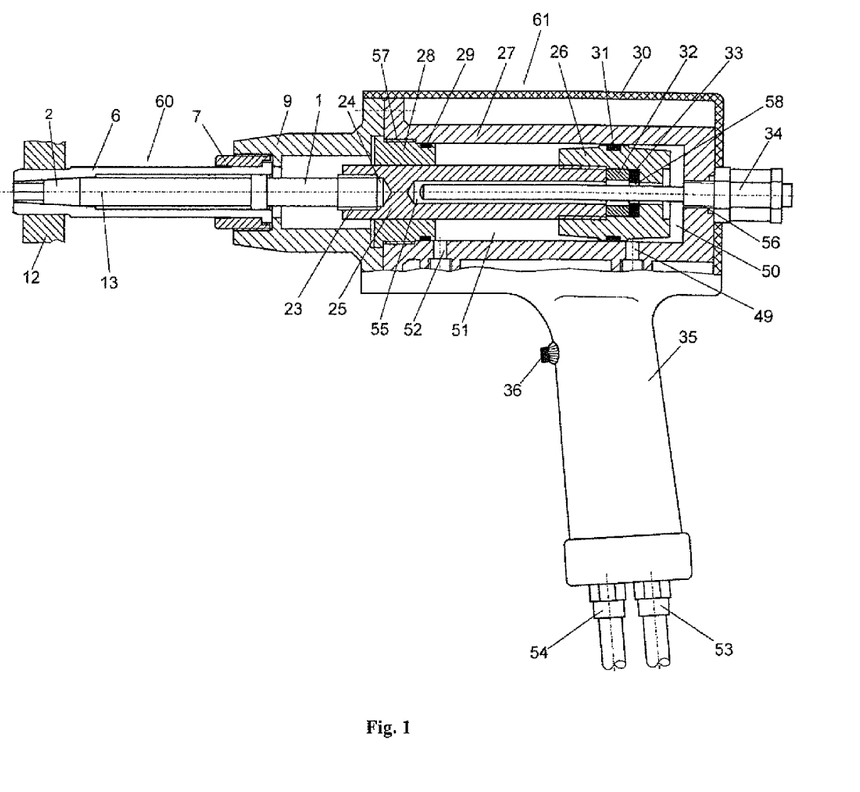
FIG. 1 is a longitudinal section of the device and tool.

Between the flange 9 and the hydraulic cylinder 27 a shutter 28 is placed coaxially with a sealing ring 29. The shutter 28 is immovably fixed to the hydraulic cylinder 27 by means of a threaded connection 57. In axial hole 58 of the piston 26, without an axial clearance are positioned a spacer bush 32 and a magnet 33, needed for activating the linear displacement sensor 34. The hydraulic cylinder 27 is placed in a plastic casing 30, having a hollow handle 35 with a start button 36. At the end of the handle 35 pipe unions 53 and 54 are fixed. In the hydraulic cylinder 27 radial holes 49 and 52 are made, through which the working fluid passing through the pipe unions 53 and 54, enters respectively piston chamber 50 and rod chamber 51 of the hydraulic cylinder 27.

The tool 60 for cold expansion of holes (FIG. 2) comprises a mandrel 1 with a conical working part 2, such that between the mandrel 1 and the hole 3 to be worked in the work piece 12, having front face 59, a cylindrical sleeve 4 is positioned. It is longitudinally split into three, four or more parts called segments 6, and has a conical hole 5 in one end whose cone angle is equal to angle $\alpha$ of the working conical part 2 of the mandrel 1. The cylindrical sleeve 4 is entirely split from end to end into separate segments 6, and then they are radially moved to the common axis 13 of the mandrel 1 and the sleeve 4 so that to touch each other without a clearance. At their other end the segments 6 are placed without a clearance in a cylindrical hole 14 of the threaded bush 7 and along outer cylindrical surface 8 of the mandrel 1, which is in contact with the inner cylindrical surface 20 of the segments 6. The threaded bush 7 is fixed immovably to the flange 9 of device 61 for cold extension, fixing segments 6 in axial direction as well. Each segment 6 gets into contact with conical surface 15 of the conical working part 2 of the mandrel 1 along only one generatrix 16, lying in the symmetry plane 17 of the respective segment 6 for each reciprocal position of the mandrel 1 and segments 6. To facilitate mounting, chamfers 22 have been made on segments 6.

Figure 2:
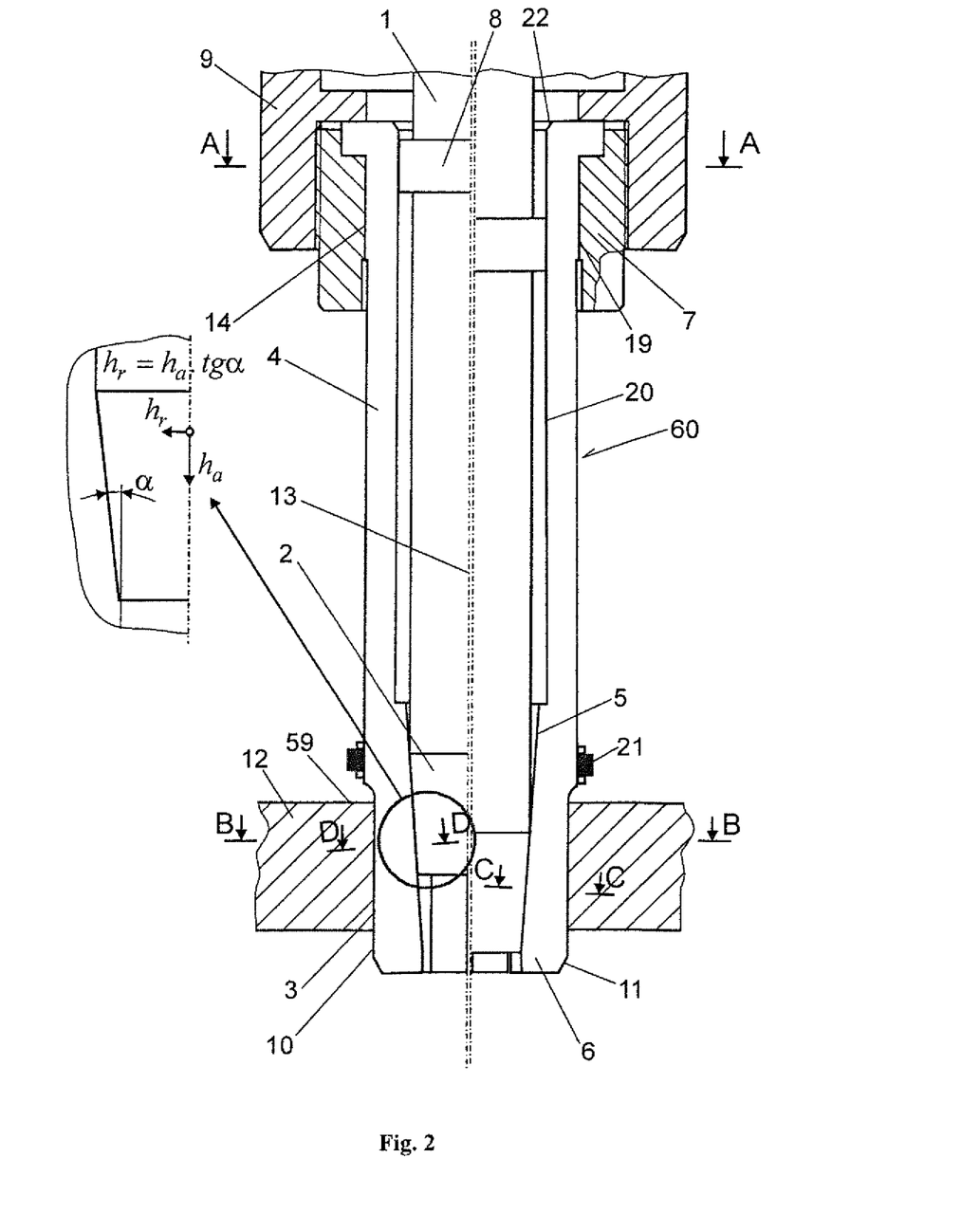
FIG. 2 is a longitudinal section through the tool with bending loaded segments.
Figure 3:
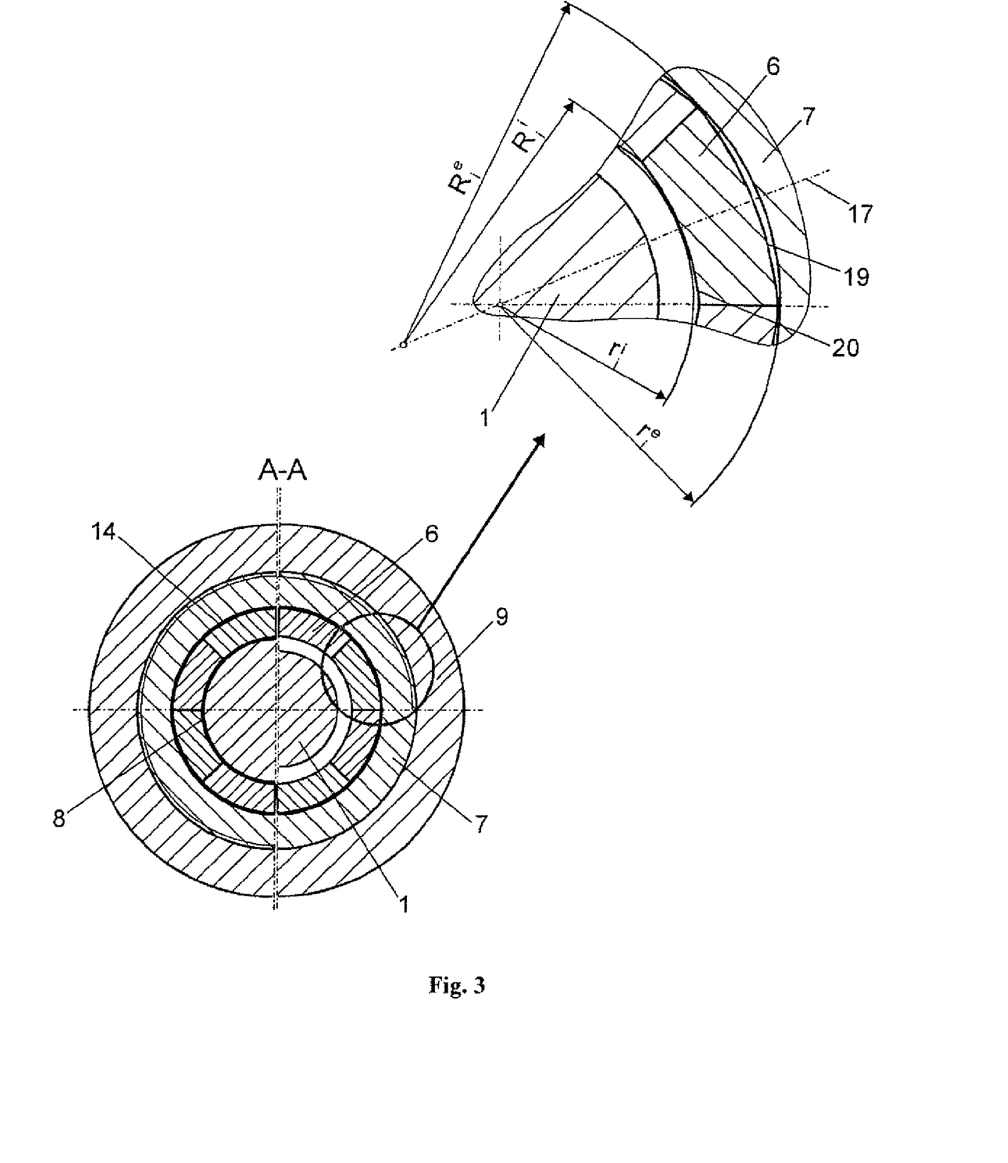
FIG. 3 is across section along A-A from FIG. 2.
Figure 4:
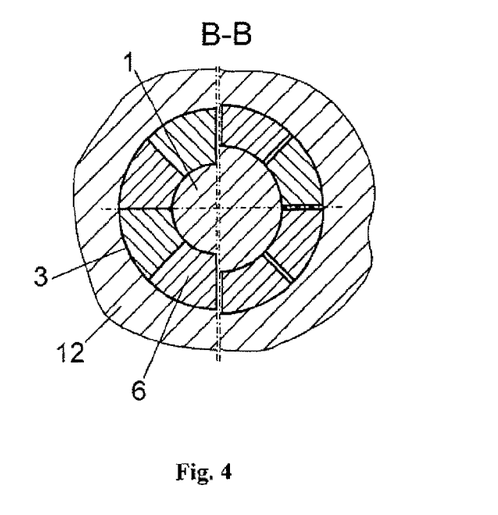
FIG. 4 is across section along B-B from FIG. 2.
Figure 5:
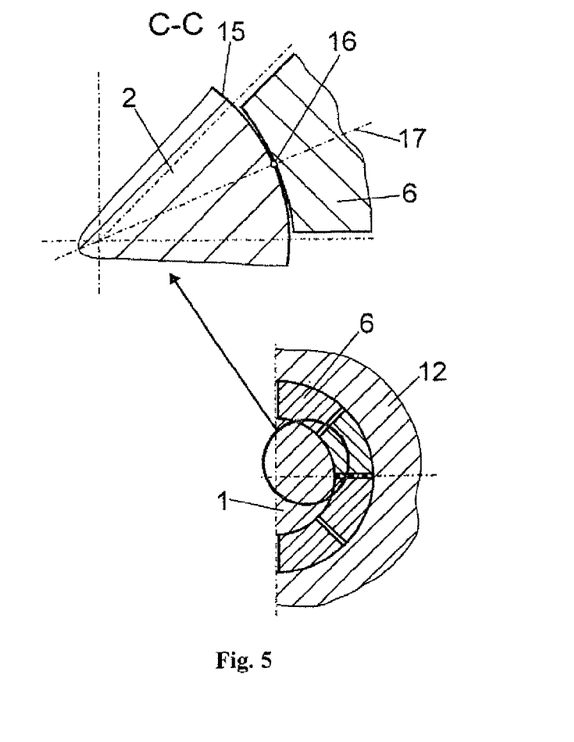
FIG. 5 is across section along C-C from FIG. 2.

Around outer cylindrical surfaces 19 of segments 6, at a distance of up to 10 mm from their working surfaces 10, in contact with the hole to be cold expanded, an elastic element 21 is attached designed for returning the segments 6 to their original state of sideway touching after their radial displacement. In this way the introduction of segments 6 into the hole 3 to be worked is facilitated. The introduction of segments 6 is also facilitated by chamfers 11, made on their working surfaces 10.

Before the cylindrical sleeve 4 was split along its axis, it had had radii of its outer and inner rotational surfaces, respectively $R_i^e$ and $R_i^i$. After splitting the cylindrical sleeve 4 and radial displacement of the resulting segments 6 to the axis 13 up to their sideway touching without a clearance, the homonymic rotational surfaces of the segments 6 form the respective continuous surface which is not smooth due to longitudinal edges formed by the side contacts between the segments 6. The radii of the circumscribed circles around the obtained continuous but not smooth outer surfaces are $r_t^e$, and the radii of the inscribed circles around the obtained continuous but not smooth inner surfaces are $r_t^i$. The two groups of radii, on one hand $R_i^e$ and $R_i^i$, and on the other hand $r_t^e$ and $r_t^i$, are in correlation. If the radii $r_t^i$ and $r_t^i$ are known, as well as the number n of the segments and the width $\delta$ of the tool with which the cylindrical sleeve 4 is longitudinally split, the diameter dimensions, respectively the radii $R_i^e$ and $R_i^i$, of the cylindrical sleeve 4 with which the latter to be made, can be calculated.

Figure 6:
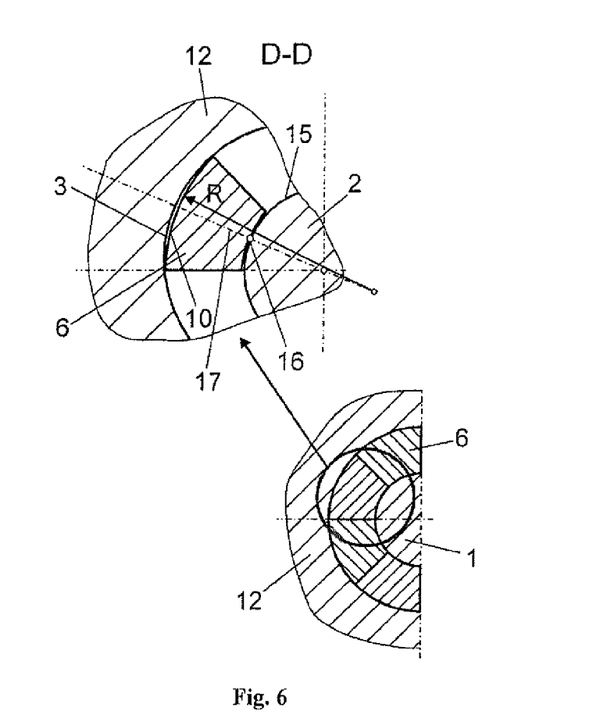
FIG. 6 is a cross section along D-D from FIG. 2.

With a view to make a hole with minimum deviation from the correct geometrical shape after the cold expansion, the working cylindrical surfaces 10 (FIG. 6) of the segments 6, which are in contact with the hole 3 to be worked, can be worked with radius R, which depends on the diameter $d_0$ of the previously drilled hole and on the degree of cold extension in percentage DCE. For instance, if $d_0$=4 mm, DCE=4%, it follows for R:R=3.12 mm.

Figure 8:
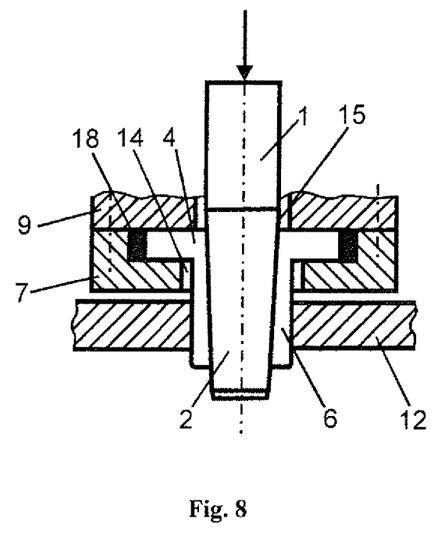
FIG. 8 is a longitudinal section through another embodiment of the tool.

In one embodiment of the tool 60 (FIG. 8), the segments 6 are placed in the cylindrical hole 14 of the threaded bush 7 with a possibility for radial displacement such that between the segments 6 and threaded bush 7 an elastic element 18 is placed.

Figure 7:
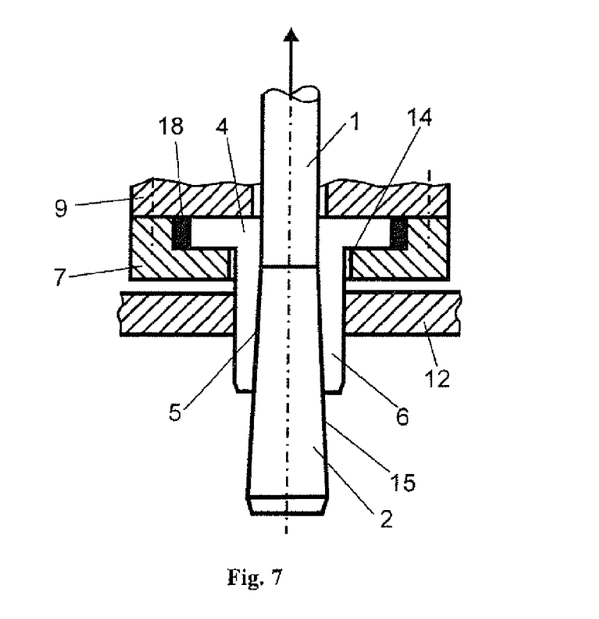
FIG. 7 is a longitudinal section through a tool with radially moving segments.

In another embodiment of the tool 60 (FIG. 7), the conical hole 5 in the split sleeve 4 and the conical surface 15 of the working part 2 of the mandrel 1 expand in the direction of the end of the split sleeve 4. This end is in contact with the hole 3 which is to be plastically deformed.

Cold expansion of fastener holes by means of the device 61 and tool 60 is carried out in the following way: by means of a handle 35 of the device 61 the operator introduces the segments 6 into the previously drilled hole 3 of work piece 12, which is facilitated by the chamfers 11 and elastic element 21. The end of the working surfaces 10 of the segments 6 coincides with the hole edge from the front face 59 of work piece 12, as it is shown in FIG. 2. There is a clearance between the segments 6 and the hole 3.

Figure 9:
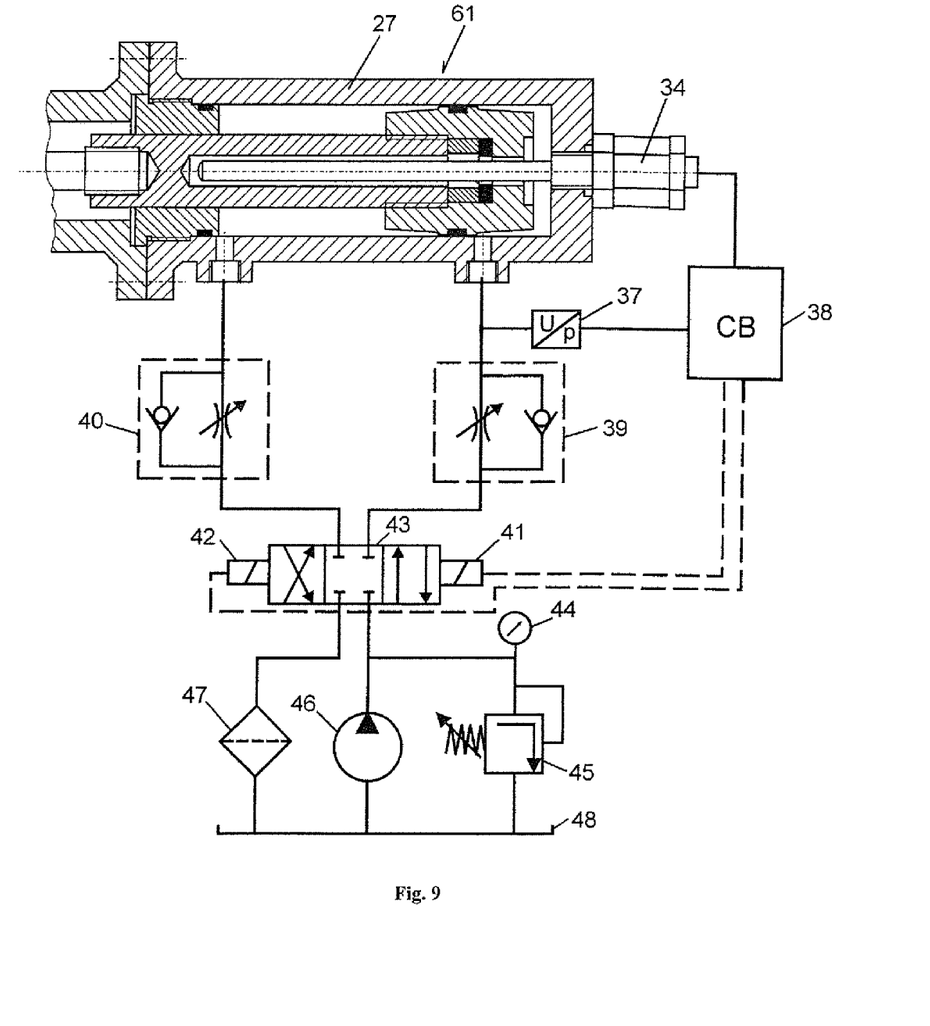
FIG. 9 is a diagram of the driving electro-hydraulic system connected to the device.

In advance, for the whole class of holes to be worked with the mounted in device 61 tool 60, in the control block 38 minimum pressure $p_{min}$ and length $h_a$ of the axial stroke of the mandrel 1 are preset with a view of conducting two successive checks, respectively a check for reaching the initial minimum pressure $p_{min}$, which guarantees hard contact between the conical working part 2 of the mandrel 1, the segments 6 and the hole 3 to be worked and a second check for the following axial displacement $h_a$ of the mandrel 1. As a result, the axial stroke $h_a$ of the mandrel 1 and the radial travel $h_r$ of the segments 6 of the tool 60 are in linear dependency $h_r/h_a$=tg$\alpha$, for each value of $h_a$, respectively, the transfer function between the axial $h_a$ and radial $h_r$ displacements is linear. The safety valve 45 is set for the working pressure.

After pressing the start button 36, located in handle 35 of the device 61, voltage is applied from the control block 38 to the electromagnet 41 of the control valve 43, and its adjacent section is activated. As a result, the working fluid delivered by the hydraulic pump 46 passes through the right section of the control valve 43, the non-return valve of the 'throttle controllable—non-return valve' block 39 and through the pipe union 53 and hole 49 enters the piston chamber 50 of the hydraulic cylinder 27. The piston 26 starts running in the direction of the front face 59 of the work piece 12 to be worked. The working fluid pushed out of the rod chamber 51 passes through hole 52, the pipe union 54, the controllable throttle of 'throttle controllable—non-return valve' block 40, the right section of the control valve 43, filter 47 and enters the tank 48. The piston 26 by means of the piston rod 25 moves axially the mandrel 1, which with its working conical part 2 radially affects the segments 6. The latter move radially to the surface of the hole 3 in the work piece 12 until the pressure in the piston chamber reaches the preset value $p_{min}$. This pressure guarantees that between the conical part 2 of the mandrel 1, the segments 6 and the hole 3 to be worked, a hard contact without a clearance is obtained.

After reaching the preset pressure $p_{min}$ in the piston chamber 50, which is registered by the pressure sensor 37, a signal is sent to the control block 38. The working stroke $h_a$ of the piston 26, respectively the mandrel 1 takes place, such that the control block 38 by the linear displacement sensor 34 monitors the reaching of the preset value of the stroke $h_a$. The mandrel 1 moves to the work piece 12 at the specified distance $h_a$, whereat the working surfaces 10 of the segments 6 move radially to the hole 3 at distance $h_r$, deforming it plastically, whereat $h_r/h_a = \mathrm{tg}\alpha$. All points from the working surface 10 of a given segment move parallel with its plane of symmetry 17. The cold expansion of the hole to be worked is completed after reaching stroke $h_a$ of the piston 26, respectively, the mandrel 1.

The formation of residual stress zone around the hole 3 in the work piece 12 begins after switching the electromagnet 42 of the control valve 43 by the control block 38 As a result, the adjacent section of the control valve 43 is activated and the working fluid from the pump 46 passes through the left section of the control valve 43, the non-return valve of the 'throttle controllable—non-return valve' block 40, the pipe union 54 and through the hole 52 enters the rod chamber 51 of the hydraulic cylinder 27. The piston 26, together with the piston rod 25 and the mandrel 1 starts moving away from the work piece 12, whereat the segments 6 owing to their elasticity and under the effect of the elastic element 21 move radially to the axis 13, until their working surfaces 10 are separated from the hole 3 which is already expanded. The working fluid pushed out of the piston chamber 50 of the hydraulic cylinder 27 passes through the controllable throttle of the 'throttle controllable—non-return valve' block 39, the left section of the control valve 43, the filter 47 and enters the tank 48. After the piston 26 moves away as much as possible from the work piece 12, i.e. takes an extreme right position, the pressure rises, the safety valve 45 is activated and the whole left section of the control valve 43 is shut down and thus the formation of residual stress zone around hole 3 in work piece 12 is completed and the operator releases button 36. The control block 38 allows the operator to release the start button 36 after finishing the process of cold expansion and then the mandrel 1 is automatically returned. After the effect of segments 6 on the hole 6 ceases, the yielding layer of metal around the hole whose diameter has been increased opposes the natural bias of the material particles of the work piece to spring back to their initial position As a result of the blocked, obstructed shrinkage of the metal, residual circumferential normal compression stresses occur around the hole with minimum and symmetrical axial gradient which, like a bracket close the existing microcracks and impede the appearance of new ones.

Finally, the operator takes out the tool from the expanded hole 3 by means of the handle 35 of the device.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tool for cold expansion of fastener holes comprising a mandrel with a conical working part, such that between the mandrel and the hole to be worked is placed a longitudinally split into three or more parts cylindrical sleeve with a conical hole at one end whose cone angle is equal to an angle of the mandrel working conical part, wherein the cylindrical sleeve (4) is entirely split from end to end into separate, laterally touching one another without a clearance, segments (6), which are fixed in a cylindrical hole (14) of a threaded bush (7) and along the outer cylindrical surface (8) of the mandrel (1), such that the threaded bush (7) fixes the segments (6) in axial direction as well and serves for an immovable fixation of the split sleeve (4) to a driving device, and each segment (6) gets into contact with the conical surface (2) of the mandrel (1) along only one generatrix (16), laying in the symmetry plane (17) of the respective segment for each reciprocal position of the mandrel (1) and segments (6).

2. A tool according to claim 1, wherein around the outer cylindrical surfaces (19) of the segments (6), at a distance of up to 10 mm from their working surfaces (10), in contact with the hole (3) to be cold expanded, an elastic element (21) is attached.

3. A tool according to claim 1, wherein the segments (6) are positioned in the cylindrical hole (14) of the threaded bush (7) with a possible radial displacement, such that between the segments (6) and the threaded bush (7) an elastic element (18) is placed.

4. A tool according to claim 1 or 3, wherein the conical hole (5) in the split sleeve (4) and the conical surface (15) of the working part (2) of the mandrel (1) expand in the direction of an end of the split sleeve 94) which is in contact with the hole (3) to be worked.

5. A tool according to claim 1, 3 or 4 wherein homonymic rotational outer surfaces (19) with radii $R_i^e$ of the segments (6) form a respective continuous outer surface which is not smooth, such that the radii of the circles circumscribed around obtained continuous, but not smooth, outer surfaces are $r_i^e$, whereat:

$$R_i = r_i \left( 1 + \frac{k^2}{\sin\frac{\pi}{n}} + \frac{2k}{\mathrm{tg}\frac{\pi}{n}} \right)^{\frac{1}{2}},$$

$$\text{where } k = \frac{\delta}{2r_i},$$

$\delta$ is the width of the tool with which the cylindrical sleeve (4) is split longitudinally, and n is the number of segments (6).

6. A tool according to claim 1, 3 or 4, wherein homonymic rotational outer surfaces (19) with radii $R_i^e$ of the segments (6) form a respective continuous outer surface which is smooth.

7. A tool according to claim 1, 3, 4 or 5, wherein homonymic rotational inner surfaces (20) with radii $R_i^i$ of the segments (6) form a respective continuous inner surface which is not smooth, such that radii of the inscribed circles in obtained continuous, but not smooth, inner surfaces are $r_i^i$, whereat:

$$R_i^i = r_i + \frac{\delta}{2\sin\frac{\pi}{n}},$$

where δ is the width of the tool with which the cylindrical sleeve (4) is split longitudinally, and n is the number of segments (6).

8. A tool according to claim 4, 3, 4 or 5, wherein homonymic rotational inner surfaces (20) with radii $R_i^i$ of the segments (6) form a respective continuous inner surface which is smooth.

9. A tool according to claim 1, 3 or 4, wherein working surfaces (10) of the segments (6), having a contact with the hole (3), to be cold expanded, have radii R, determined by the formula:

$$R = \frac{d_0}{2}\left(1 + \frac{DCE}{100}\right),$$

where $d_0$ is the diameter of the hole previously drilled, DCE is the degree of cold expansion in percentage.

* * * * *